United States Patent
Dattatri et al.

(10) Patent No.: US 11,003,433 B1
(45) Date of Patent: May 11, 2021

(54) SYSTEM AND METHOD FOR IMPROVED PEER-TO-PEER SOFTWARE DISTRIBUTION

(71) Applicant: DELL PRODUCTS, LP, Round Rock, TX (US)

(72) Inventors: Maheshwar Dattatri, Cedar Park, TX (US); Babacar Diouf, Pflugerville, TX (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 16/782,801

(22) Filed: Feb. 5, 2020

(51) Int. Cl.
| | |
|---|---|
| G06F 9/44 | (2018.01) |
| G06F 8/61 | (2018.01) |
| H04L 29/08 | (2006.01) |
| G06F 8/65 | (2018.01) |

(52) U.S. Cl.
CPC .............. G06F 8/61 (2013.01); G06F 8/65 (2013.01); H04L 67/10 (2013.01); H04L 67/34 (2013.01)

(58) Field of Classification Search
CPC ... G06F 8/61; G06F 8/65; H04L 67/10; H04L 67/34
See application file for complete search history.

(56) References Cited

U.S. PATENT DOCUMENTS

| | | | | |
|---|---|---|---|---|
| 5,008,814 A | * | 4/1991 | Mathur | G06F 8/65 709/219 |
| 2002/0129356 A1 | * | 9/2002 | Hellerstein | G06F 8/61 717/177 |
| 2011/0214119 A1 | * | 9/2011 | Wookey | G06F 8/658 717/175 |
| 2016/0021168 A1 | * | 1/2016 | Chaudhri | H04L 67/025 715/740 |
| 2016/0162275 A1 | * | 6/2016 | Morley | H04W 4/60 717/170 |
| 2017/0221288 A1 | | 8/2017 | Johnson et al. | |
| 2017/0330236 A1 | * | 11/2017 | Quintero | G06F 16/9537 |
| 2019/0036932 A1 | * | 1/2019 | Bathen | H04L 9/3231 |
| 2019/0339685 A1 | * | 11/2019 | Cella | G06N 20/00 |
| 2020/0167503 A1 | * | 5/2020 | Wei | G06F 21/64 |
| 2020/0174824 A1 | * | 6/2020 | Qiu | G06F 8/61 |

FOREIGN PATENT DOCUMENTS

WO  WO 2019 033116 A1  2/2019

OTHER PUBLICATIONS

Title: Blockchain-oriented software engineering: challenges and new directions author: S Porru, Published on 2017.*
Title: Blockchain-based smart contracts: A systematic mapping study author: M Alharby, Published on 2017.*
Title: Classification and computation of dependencies for distributed management author: A Keller published on 2000.*

* cited by examiner

*Primary Examiner* — Chameli Das
(74) *Attorney, Agent, or Firm* — Larson Newman, LLP

(57) ABSTRACT

An information handling system includes a distribution management system configured to provide a software packet, the software packet including software and a smart contract. Target systems include a first tier of first target systems and a second tier of second target systems, wherein each one of the first target systems is grouped with at least one of the second target systems. A distribution management system provides the software packet to the first target systems. Each first target system executes the smart contract, and at least one first target system provides the software packet to at least one of the second target systems based upon the execution of the smart contract.

20 Claims, 6 Drawing Sheets

SYSTEM AND METHOD FOR IMPROVED PEER-TO-PEER SOFTWARE DISTRIBUTION

FIELD OF THE DISCLOSURE

This disclosure generally relates to information handling systems, and more particularly relates to peer-to-peer software distribution for information handling systems.

BACKGROUND

As the value and use of information continues to increase, individuals and businesses seek additional ways to process and store information. One option is an information handling system. An information handling system generally processes, compiles, stores, and/or communicates information or data for business, personal, or other purposes. Because technology and information handling needs and requirements may vary between different applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, reservations, enterprise data storage, or global communications. In addition, information handling systems may include a variety of hardware and software resources that may be configured to process, store, and communicate information and may include one or more computer systems, data storage systems, and networking systems.

SUMMARY

An information handling system may include a distribution management system and target systems to receive software. The distribution management system may provide a software packets that includes the software and a smart contract, where execution of the smart contract may be validated and recorded by the blockchain system. The target systems may include a first tier of first target systems and a second tier of second target systems, and each one of the first target systems may be grouped with at least one of the second target systems. The distribution management system may provide the software packet to the first target systems. Each first target system may execute the smart contract. At least one first target system may provide the software packet to at least one of the second target systems based upon the execution of the smart contract.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which.

The use of the same reference symbols in different drawings indicates similar or identical items.

DETAILED DESCRIPTION OF DRAWINGS

The following description in combination with the Figures is provided to assist in understanding the teachings disclosed herein. The following discussion will focus on specific implementations and embodiments of the teachings. This focus is provided to assist in describing the teachings, and should not be interpreted as a limitation on the scope or applicability of the teachings. However, other teachings can certainly be used in this application. The teachings can also be used in other applications, and with several different types of architectures, such as distributed computing architectures, client/server architectures, or middleware server architectures and associated resources.

Figure 1:
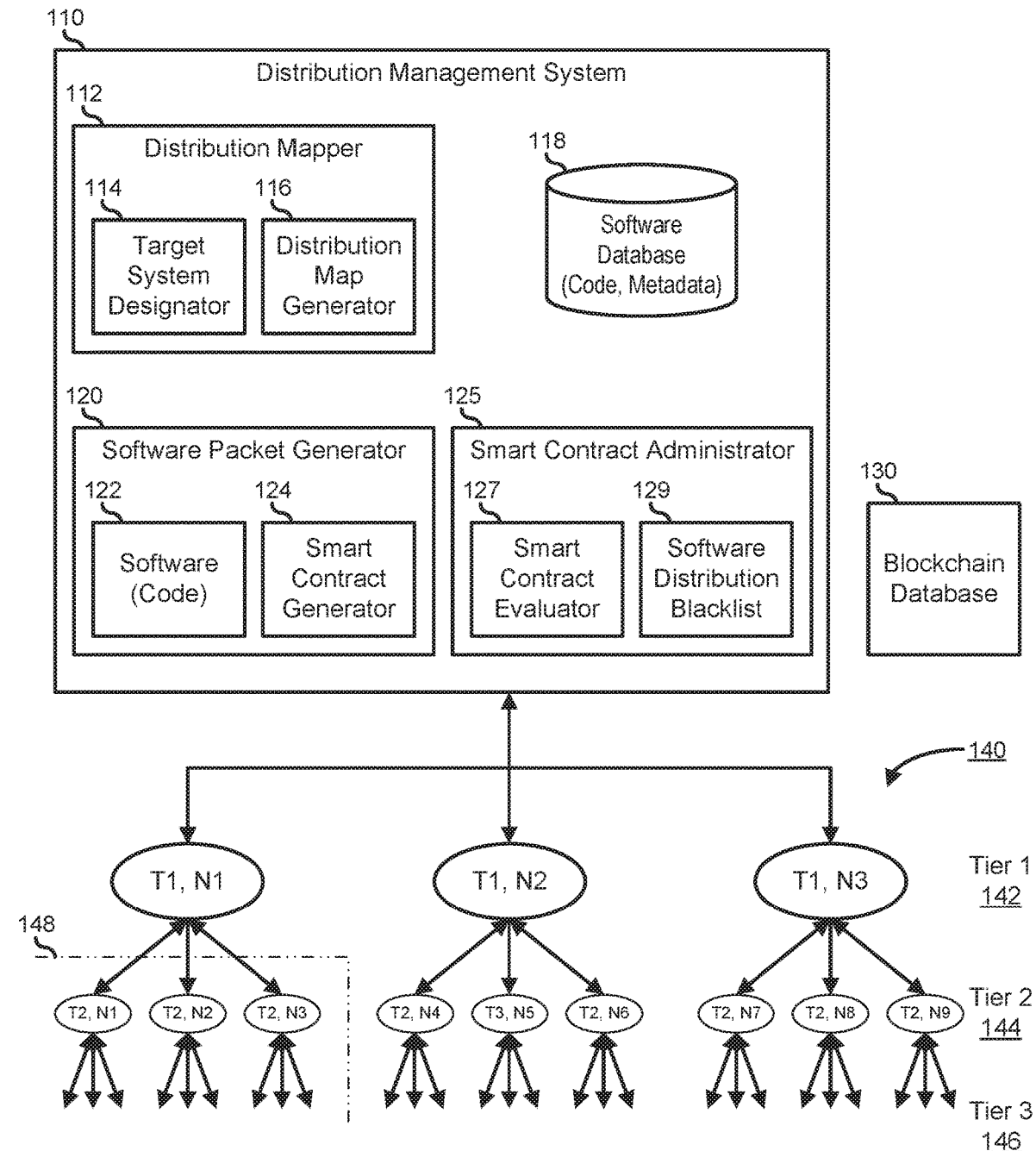
FIG. 1 is a block diagram illustrating an information handling system according to an embodiment of the present disclosure.

FIG. 1 illustrates an information handling system 100 for updating target systems in a network. Information handling system 100 includes a distribution management system 110, a blockchain database, and a network 140 of interconnected target systems. It has been understood by the inventors of the current disclosure that a typical centralized distribution of software and software updates in a network of target systems, where a centralized distribution system manages the distribution of the software and software updates to each target system in the network, is prone to single-point failures in the centralized distribution system. Moreover, such centralized distribution systems are also prone to the wide distribution of malicious software or software updates, and the mitigation of such malicious attacks is typically reactive in nature.

Information handling system 100 provides for the decentralized distribution of software and software updates by utilizing a directed peer-to-peer distribution through a dynamically determined hierarchy of target systems that manages the decentralized distribution by providing each software or software update packet (hereinafter a packet) as a smart contract that is tracked via a blockchain ledger system. Here, each target system that receives a packet executes the smart contract, and the execution of the smart contract is recorded by the blockchain leger system, and is also monitored for the success or failure of the installation of the associated software or software update. Distribution failures in the network can be monitored, and various thresholds for the continued distribution of the packets can be enforced based upon the smart contracts. The smart contracts can be utilized to implement both a software or software update "push" from the distribution system, and a software or software update "pull" on demand from the target systems within the network. Hereinafter, the term "software" will be utilized to describe both an initial version of particular software, and any updates to that particular software. Software will also be understood to include other information that can be transferred over a network of target systems, such as applications, application programming interfaces (APIs), firmware for the target systems or the elements of the target systems, multi-media content or other types of content, or other information, as needed or desired. As used herein, a smart contract will be understood to be a machine-readable program or code operable to facilitate, verify, and enforce the execution of the program by the executing target system, and to track and ensure the irreversibility of the execution of the program by embedding the program within a blockchain protocol. Here, a blockchain protocol represents a platform for creating and maintaining a growing list of records of transactions that are cryptographically linked such that each record includes a cryptographic hash of the previous block in the list, and where the authenticity of the list of records is assured by a network of systems that each maintain duplicate copies of the list of records. Examples of a block chain protocol that provides for smart contracts includes the Ethereum platform, the IBM blockchain platform, another publicly or commercially available blockchain platform, a private blockchain platform, or the like.

Distribution manager 110 represents one or more information handling system configured to manage the distribution of software within network 140. In particular, distribution manager 110 operates to determine a distribution map for the target systems of network 140. The network map consists of trusted target systems that operate as a first level of distribution and validation of the distribution for a particular software package. Distribution manager 110 next packages the software into a packet that includes a smart contract for the execution at the trusted target systems and for the redistribution of the packets to other target systems in network 140. As the packets are distributed to the target systems of network 140, distribution manager 110 operates to track the continued execution of the packets at the various target systems, determines whether the distribution was successful at each target system, determines if a number of failures of execution at the target systems exceeds one or more failure threshold, and, if the number of failures of execution at the target systems exceeds a failure threshold, blacklists the particular software distribution as to some or all of the target systems of network 140. Each distribution event to the target systems of network 140 is tracked by blockchain database system 130 to ensure that every distribution event and the resulting success or failure of the distribution events are recorded on the blockchain ledger, thus ensuring the integrity of the distribution process.

Distribution manager 110 includes a distribution mapper 112, a software database 118, a software packet generator 120, and a smart contract administrator 125. Distribution mapper 112 includes a target system designator 114 and a distribution map generator 116. Target system designator 114 receives metadata associated with particular software from software database 118 and determines a set of target systems in network 140 to which the software is applicable. For example, if the software is a firmware update for a particular component that is installed into one or more of the target systems of network 140, target system designator 114 can operate to identify the particular target systems. In another example, if the software is an application that will be of particular use to a subset of users of the target systems of network 140, such as where an accounting application may only be utilized by users that are within a finance group, while a sales application may only be utilized by users within a sales group.

As such, the designation of target systems within network 140 is dynamically provided based upon the particulars of the software to be distributed. In a particular embodiment, target system designator 114 provides the identification of the target systems as a list to be included in a smart contract, such that a particular target system of network 140 that receives the software packet can determine whether or not to forward the software packet to other target systems on the list based upon whether or not the target is within a common subnetwork, as described further below. In another embodiment, target system designator 114 provides the identification of the target systems as a rules-based input to the smart contract, such that the identification of target systems is done by the target systems themselves in executing the software packet, as described further below.

A target system, as identified by target system designator 114, does not necessarily need to be a consumer of the subject software. For example, where the accounting application is targeted to the users within the finance group, as described above, a target system may include a router for a subnetwork for the target systems in the finance group. Here, the router merely needs to include sufficient general purpose processing capabilities to execute a smart to determine that the target systems within the subnetwork are also target systems for the software packet, and to redistribute the software packet. In this case, the router may be designated as a target system, even though it is not itself a consumer of the accounting application.

With the target systems identified by target system designator 114, distribution map generator 116 operates to identify a set of trusted target systems in a first tier 142 of network 140 to which to provide an initial distribution of the software packet, and to identify subsequent tiers 144 and 146 to which the software packet can be distributed in subsequent distributions. As a first matter, the trusted target systems are identified as such because they each are connected within network 140 to distribution manager 110 and to blockchain database system 130. Second, the trusted target systems are identified as such for being typical of a larger class of the target systems in network 140. For example, where the particular software has more than one known dependency, such as upon various hardware components that can be installed on the different target systems in network 140, each one of the trusted target systems in the first tier 142 may be selected because each one includes a different one of the hardware components.

Here, each particular trusted target system can server to quickly identify issues that revolve around that system's hardware component. Further, even if the execution of the software packet by all of the trusted target systems is successful, by grouping subsequent waves of distribution of the software packet by that particular target system to other target systems with the common hardware component, the causes of failures in the subsequent waves can be quickly identified based upon the groupings. That is, if failures only occur in target systems that are grouped under a particular trusted target system, the failures can quickly be associated with the hardware component for which that particular trusted target system was selected.

Third, the trusted target systems are identified as such based upon various clustering algorithms for grouping the target systems in network 140. Continuing the example where the particular software has more than one known hardware component dependency, but where each of the target systems in network 140 may include two or more of the various hardware components, distribution map generator 116 can use a k-means clustering algorithm to characterize the trusted target systems as mathematical mean systems around which a largest number of similar systems are clustered. Other clustering algorithms may be utilized as needed or desired.

In a particular embodiment, such as where target system designator 114 provides the identification of the target systems as a list, distribution map generator 116 provides the distribution map as an input to the smart contract as a specific set of target systems within network 140 to which to distribute the software packet in each distribution. In another embodiment, such as where target system designator 114 provides the identification of the target systems as a rules-based input to the smart contract, distribution map generator 116 provides the distribution map as a rules-based input to the smart contract, such that the identification of target tiers of target systems is done by the target systems themselves in executing the software packet.

Software packet generator 120 includes the software 122, that is, the code or data, to be distributed from software database 118, and a smart contract generator 124, and operates to package the software into a packet that includes software and the smart contract for the execution at the trusted systems and for the redistribution of the packets to other target systems in network 140. It will be understood that software 122 may represent the particular code associated with the software to be distributed, or may include another mechanism for the secure distribution of the software, such as a link to a secure web portal for downloading the software, credentials for a virtual private network or other secure mechanism for downloading the software, as needed or desired. Smart contract generator 124 receives the target system list from target system designator 114 and the distribution map from distribution map generator 116, and includes that information in the smart contract, along with additional contract terms that associate the receipt and execution of the software packet by a target system in network 140 with various success and failure metrics, redistribution information, and, as necessary, rules for providing a proxy service to access distribution manager 110 and blockchain database system 130 for target systems that are otherwise isolated from the distribution manager and the blockchain database, as indicated by the subnetwork 148.

Proxying of distribution will be described further below. Smart contract generator 124 further operates to instantiate contract terms and rules that are expected to identify anomalous behavior in the execution of the smart contracts in the software packets by the target systems in network 140. For example, smart contract generator 124 may use one or more machine learning algorithm, such as a random forest algorithm or the like, to predict the probability that various transactions are malicious or fraudulent based upon features associated with the software or the target systems in network 140. Here, smart contract generator 124 can operate in conjunction with a smart contract evaluator 127, described below, to modify or update the terms of the smart contracts generated based upon machine learning within the smart contract evaluator to blacklist various software packets, as described further below.

Smart contract administrator 125 includes smart contract evaluator 127 and a software distribution blacklist 129. Smart contract evaluator 127 receives confirmations from the target systems on network 140 of the success or failure of the execution of the smart contracts on the target systems. If the execution of the smart contracts failed on one or more of the target systems, smart contract evaluator 127 determines if a number of failures of execution at the target systems exceeds one or more failure threshold associated with the smart contracts, and, if the number of failures of execution at the target systems exceeds a failure threshold, provides the information related to the failed smart contacts to software distribution blacklist 129 to halt further distribution of the particular software packet. A failure of a smart contract associated with a particular software packet may represent the inability of a particular target system to download or install the software, the subsequent failure of the target system to operate properly once the software is downloaded or installed, the identification of an incompatibility of the software with another hardware or software component of the target system, the lack of sufficient authentication credentials on the part of a user of the target system, or other failures, as needed or desired.

Smart contract evaluator 127 further operates to evaluate the contract terms and rules and identifies anomalous behavior in the execution of the smart contracts in the software packets by the target systems in network 140. For example, smart contract evaluator 127 may use one or more machine learning algorithm, such as a random forest algorithm or the like, to determine the probability that various transactions are malicious or fraudulent based upon features associated with the software or the target systems in network 140. Here, smart contract evaluator 127 can analyze the results to determine that failures are clustered based upon various metrics of the software or the target systems in network 140. For example, failures can be clustered based upon hardware failures such as installation failures, software or system crashes, and the like, based upon software metadata such as the author of the software, the size of the software for the intended use, the version or type of software, and the like, based upon target system information such as target system type, operating system, configuration, organization, or the like, or based upon other associations between the hardware and the software, as needed or desired. The learnings derived by smart contract evaluator 127 can be supplied to smart contract generator 124 to ensure that the contract terms provided by the smart contract generator remain in step with the latest learnings from the smart contract evaluator.

A particular software may be associated with two or more smart contracts, each associated with a different subset of the target systems of network 140, or that the software may be associated with a single smart contract, where the single smart contract that includes multiple failure conditions, each associated with a different subset of the target systems. For example, a sales application that is provided to a sales group for daily use, and that is also provided to a management group for receiving reports from the sales application. Here, a lower failure rates may be tolerable sales group and a higher failure rate may be tolerable for the management group. As such, the sales application may be provided under a first smart contract that specifies the lower failure rate to the sales group, and may be provided under a second smart contract that specifies the higher failure rate to the management group. On the other hand, the sales application may be provided to both the sales and management groups under a common smart contract that include different failure rates for the target systems in the sales group than for the target systems in the management group.

The addition of particular software to software distribution blacklist 129 may result in the total blacklisting and banning of all future distribution of the software across all target systems in network 140, such as when a total number of failures exceeds a global threshold, thus indicating that the software is largely unstable, and needs further development before being rolled out to all of the target systems of network 140. The addition of particular software to software distribution blacklist 129 may result in a partial blacklisting and banning of some future distribution of the software across the target systems in network 140, such as when an incompatibility with the software is identified in target systems with a particular component, but where the software runs correctly in target systems that do not include the particular component. In this regard, the provision of software packaged with smart contracts may also lead to the rapid identification of incompatibilities or other issues with the software distribution.

Figure 2:
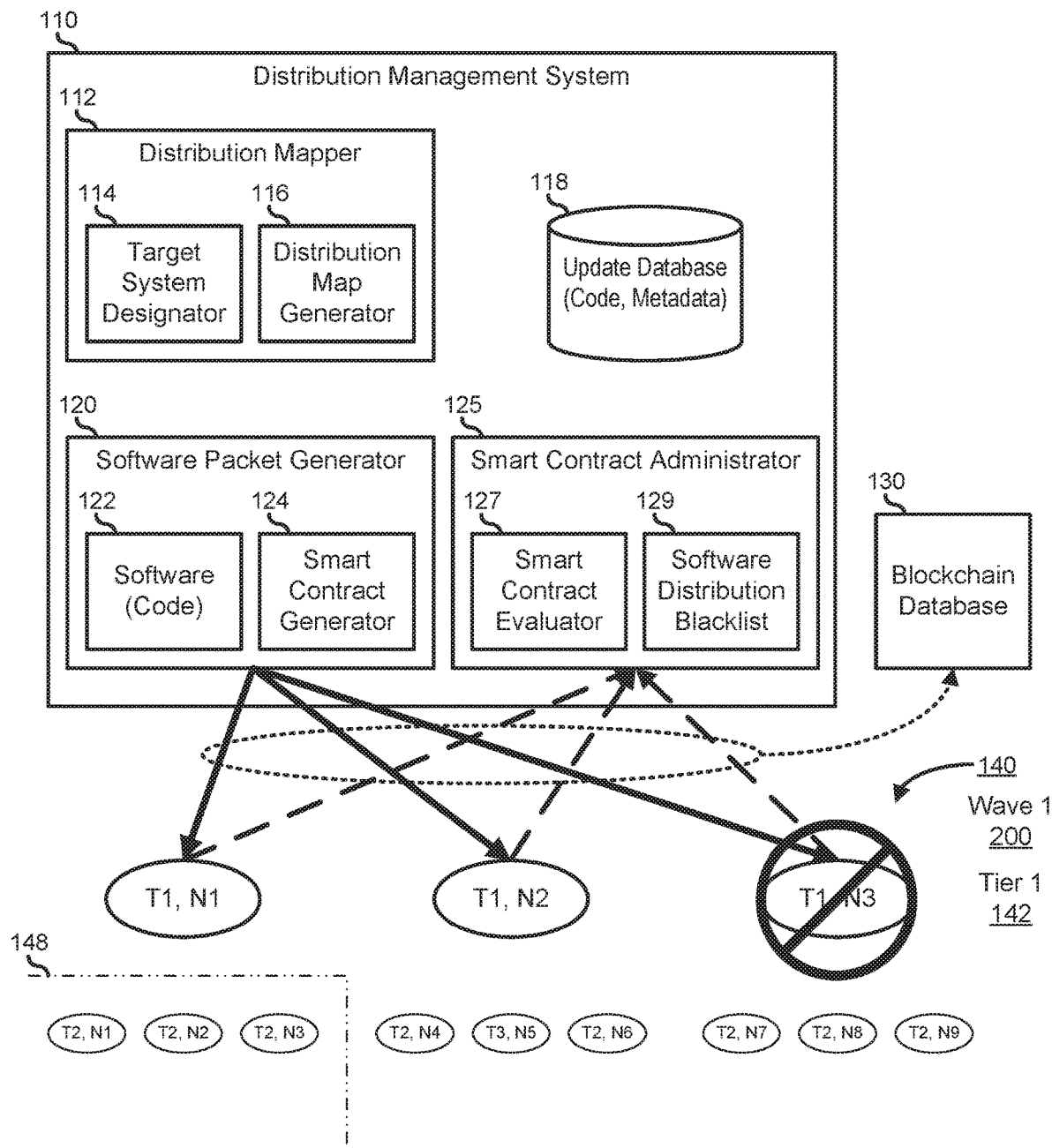
FIGS. 2-4 illustrate the distribution of software in the information handling system of FIG. 1.

FIGS. 1-4 illustrate the distribution of particular software packet in information handling system 100. In FIG. 1, distribution mapper 112 receives the metadata associated with the particular software from software database 118, and generates the illustrated distribution map. Here, the distribution map consists of three target systems in a first tier 142 (nodes 1-3), nine target systems in a second tier 144 (nodes 1-9), and an unspecified number of target systems in a third tier 146. FIG. 2 illustrates a first wave 200 of distribution of software packets from distribution management system 110 to the target systems in the first tier 142. The smart contracts in the software packets are executed by the target systems. The results of the execution of the smart contracts in the target systems of the first tier 142 are reported back to smart contract administrator 125, and are memorialized in the blocks of blockchain database system 130. The distribution of the software packet and the execution of the smart contract for the third node is indicated to have failed, and so the further distribution in subsequent waves by the third node is blacklisted by software distribution blacklist 129.

Figure 3:
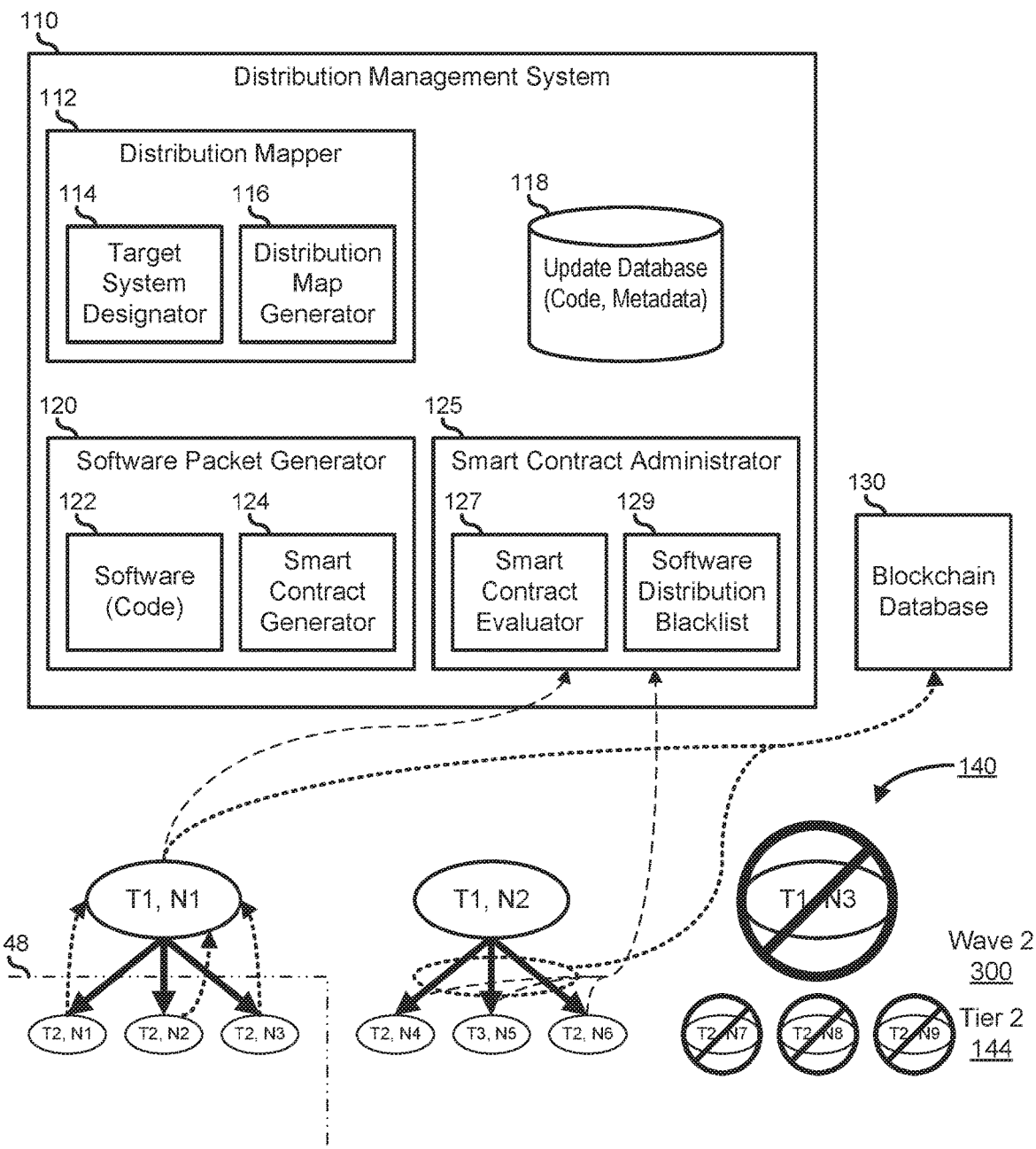

FIG. 3 illustrates a second wave 300 of distribution of software packets from the non-blacklisted target systems (nodes 1-2) in the first tier 142 to the target systems in the second tier 144. The smart contracts in the software packets are executed by the target systems. The results of the execution of the smart contracts in the target systems of the second tier 142 that are capable of direct network communication with distribution management system 110 and blockchain database system 130 are reported back to smart contract administrator 125, and are memorialized in the blocks of blockchain database system 130. However, where one or more target system of the second tier 142 are not capable of direct network communication with distribution management system 110 and blockchain database system 130, as illustrated by subnetwork 148, the target systems in the subnetwork report their results back to the source of the software packets, and that target system acts as a proxy for the target systems in the subnetwork to the distribution management system and to the blockchain database.

Figure 4:
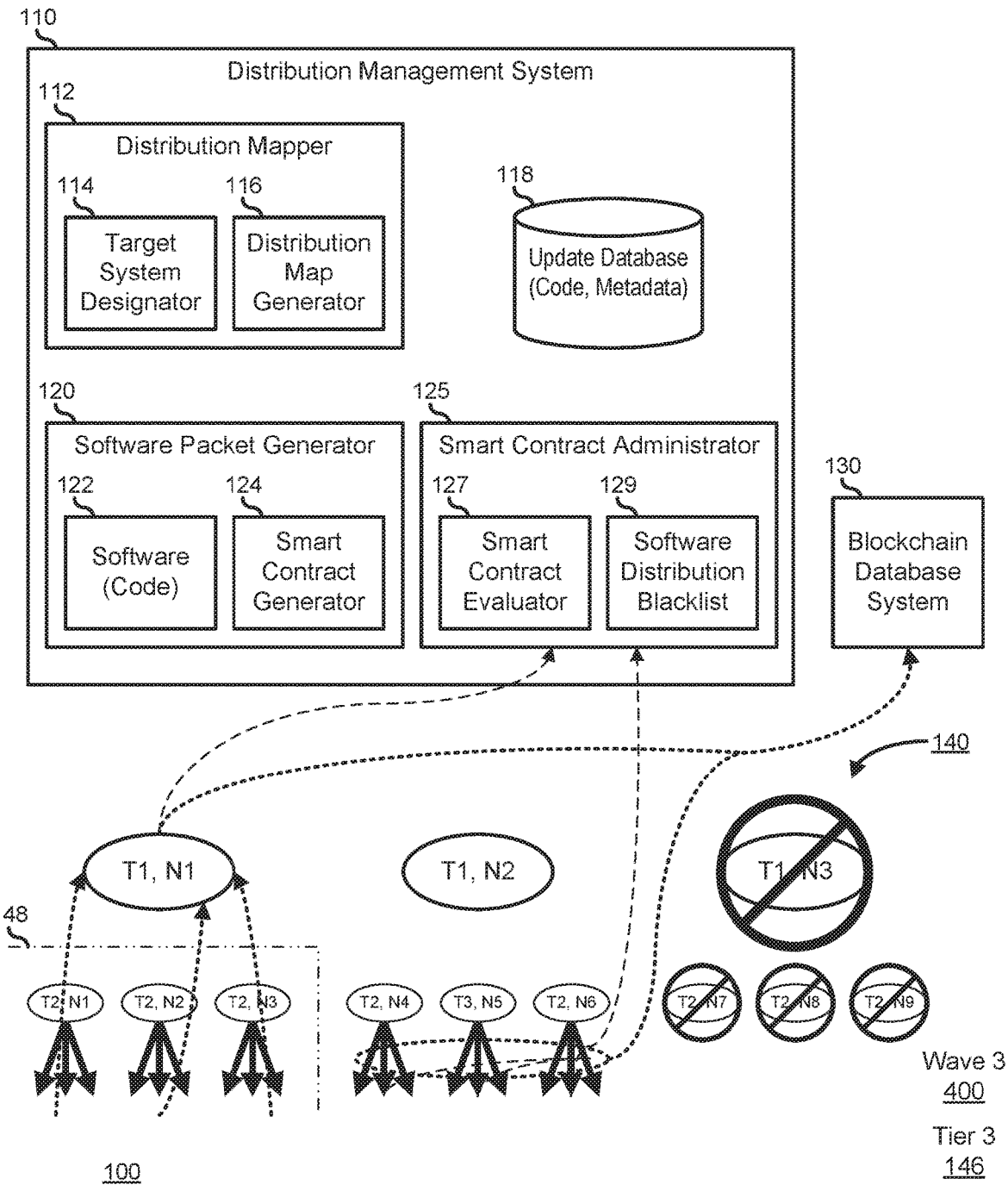

No distribution of software packets is provided to the target system (nodes 7-9) in the second tier 144 that are under the blacklisted target system (node 3) in the first tier 142. FIG. 4 illustrates a third wave 400 of distribution of software packets from the non-blacklisted target systems (nodes 1-6) in the second tier 144 to the target systems in the third tier 146. The smart contracts in the software packets are executed by the target systems. Here, the results of the execution of the smart contracts in the target systems of the third tier 142 that are capable of direct network communication with distribution management system 110 and blockchain database system 130 are reported back to smart contract administrator 125, and are memorialized in the blocks of blockchain database system 130. Again, the target systems in subnetwork 148 utilize a proxy to communicate with distribution management system 110 and blockchain database system 130, and no distribution is made to the blacklisted target systems.

In a particular embodiment, when a trusted target system in the first tier 142 fails the execution of the smart contract, as shown in FIG. 2, distribution mapper 112 operates to determine if a cause of the failure is unique to the trusted target system, or is common to all of the target systems in the lower tiers 144 and 146. If the cause of the failure is unique to the trusted target system, then distribution mapper 112 operates to identify a new trusted target system among the lower tiers 144 and 146, and prompts software packet generator 120 to generate new software packets to be distributed to the new trusted target system, in order to circumvent the failed target system to distribute the software packets to the previously blacklisted target systems.

Information handling system 100 represents a decentralized system for the distribution of software in network 140. In particular, note that, once software packet generator 120 generates the software packet, including the software and the smart contract, and distribution manager 110 distributes the software packet to each of the trusted target systems in tier 142, the involvement of the distribution manager in the distribution of the software packet to the target systems in network 140 is completed, and the distribution manager is not needed to distribute the software packet to the target systems in the lower tiers 144 and 146. More particularly, after the provision of the software packet in the first wave 200 to the trusted target systems in the first tier 142, distribution manager 110 may be relegated to tracking the progress of the software packet through the target systems in tiers 144 and 146, and blacklisting of the software packet, either as to one or more trusted target systems, as to the target systems grouped under the blacklisted trusted target systems, or as to all of the target systems in network 140 based upon a global failure threshold. As such, the enforcement of the blacklist as managed by software distribution blacklist 129 need not be centralized. That is, distribution manager 110 is not needed to enforce the blacklist. Instead, the smart contract of the software packet can include terms whereby a target system that receives the software packet must access distribution manager 110 to determine if the software packet or the target system is blacklisted, or is otherwise not intended to apply the software packet to itself. Thus, once the software packet is delivered to the trusted target systems in tier 142 in the first wave 200 from distribution manager 110, the continued distribution and execution of the software packet is managed by self-enforcing terms of the smart contract.

Figure 5:
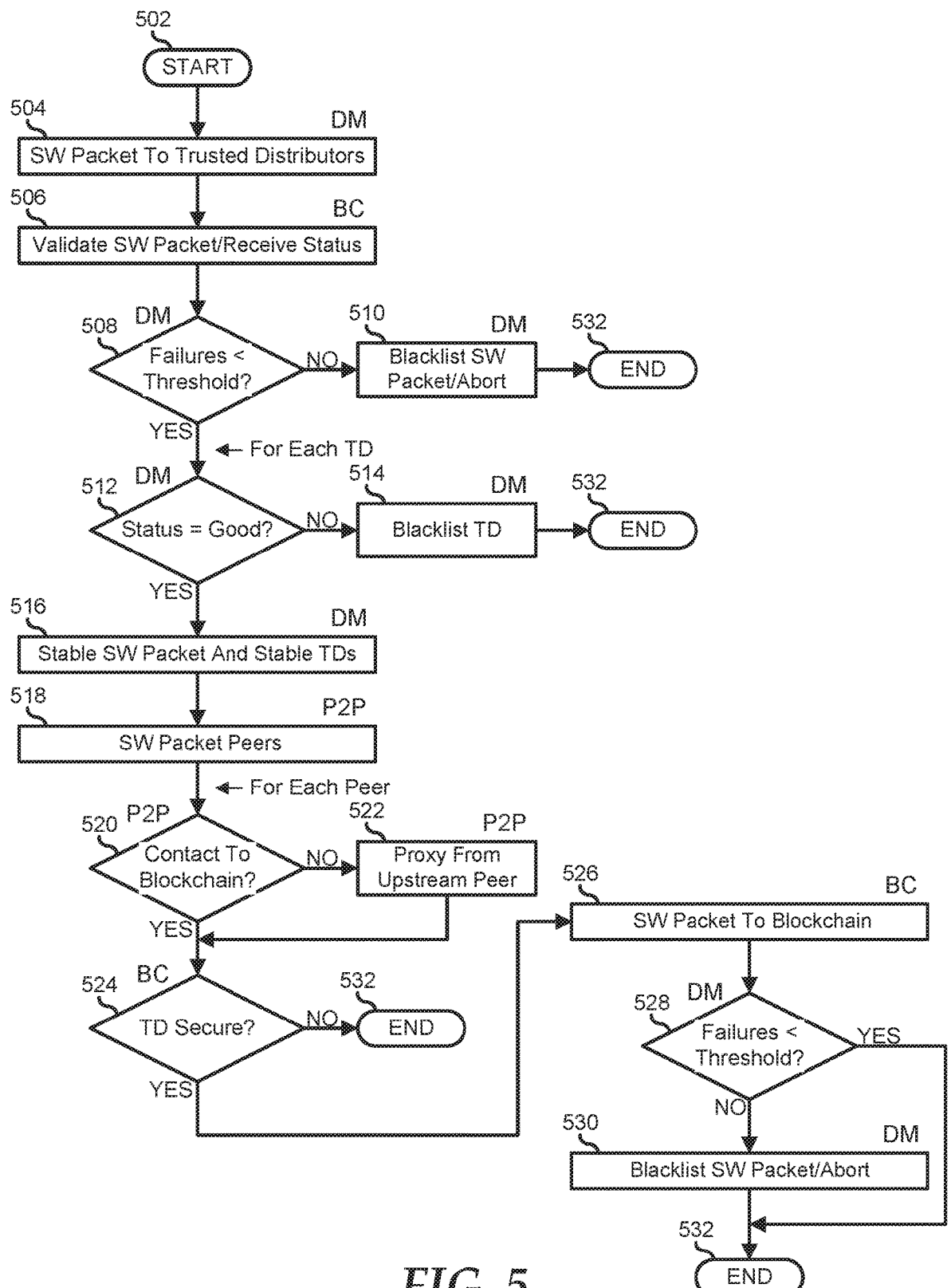
FIG. 5 is a flowchart illustrating a method for intelligent peer-to-peer software distribution according to an embodiment of the present disclosure.

FIG. 5 illustrates a method for intelligent peer-to-peer software distribution, starting at block 502. A distribution module provides a software packet to the trusted target systems in a network in block 504. The trusted target systems validate the software packet with a blockchain database, execute the smart contract embedded in the software packet, and provide status of the execution of the smart contract to the blockchain database in block 506. The distribution module makes a decision whether or note a number of failures on the trusted target systems is less than a trusted system threshold in decision block 508. If not, then there are too many failures, the "NO" branch of decision block 508 is taken, the software packet is blacklisted globally and the distribution is aborted in block 510, and the method ends in block 532.

If the number of failures on the trusted target systems is less than a trusted system threshold, the "YES" branch of decision block 508 is taken and, for each non-failing trusted target system, a decision is made as to whether or not the status of the trusted target system is good in decision block 512. If not, the "NO" branch of decision block 512 is taken, the software packet is blacklisted as to that distributor system and the target systems grouped thereunder in block 514, and the method ends in block 532 as to that particular trusted target system. If the status of the remaining trusted target system is good, the "YES" branch of decision block 512 is taken, the distribution module makes the software packet and the trusted target systems as stable in block 516, and the trusted target systems distribute the software packet to the peer target systems of the associated groups in block 518. For each peer target system that receives the software packet, a decision is made as to whether or not the peer device is able to contact the blockchain database and the distribution module in decision block 520. If not, the "NO" branch of decision block 520 is taken, the peer device executes the smart contract associated with the software packet and reports the result to the target system that distributed the software packet in block 522, and the method proceeds to decision block 524.

After the peer device executes the smart contract associated with the software packet and reports the result to the target system that distributed the software packet in block 522, or if the peer device is able to contact the blockchain database and the distribution module as determined in decision block 520, a decision is made by each peer device as to whether or not the trusted target system is secure and the software packet is verified to be secure in decision block 524. If not, the "NO" branch of decision block 524 is taken and the method ends as to that peer target system in block 532. If the trusted target system is deemed secure and the software packet is verified by the remaining peer target systems, the "YES" branch of decision block 524 is taken and the peer devices each execute the smart contract associated with the software packet and send the results to the blockchain database and to the distribution module in block 526. The distribution module makes a decision whether or not a total number of failures on the trusted and peer target systems is less than a global threshold in decision block 528. If not, then there are too many failures in the network, the "NO" branch of decision block 528 is taken, the software packet is blacklisted globally and the distribution is aborted in block 530, and the method ends in block 532. If the total number of failures on the trusted and peer target systems is less than the global threshold, the "YES" branch of decision block 508 is taken and the method ends in block 532.

Figure 6:
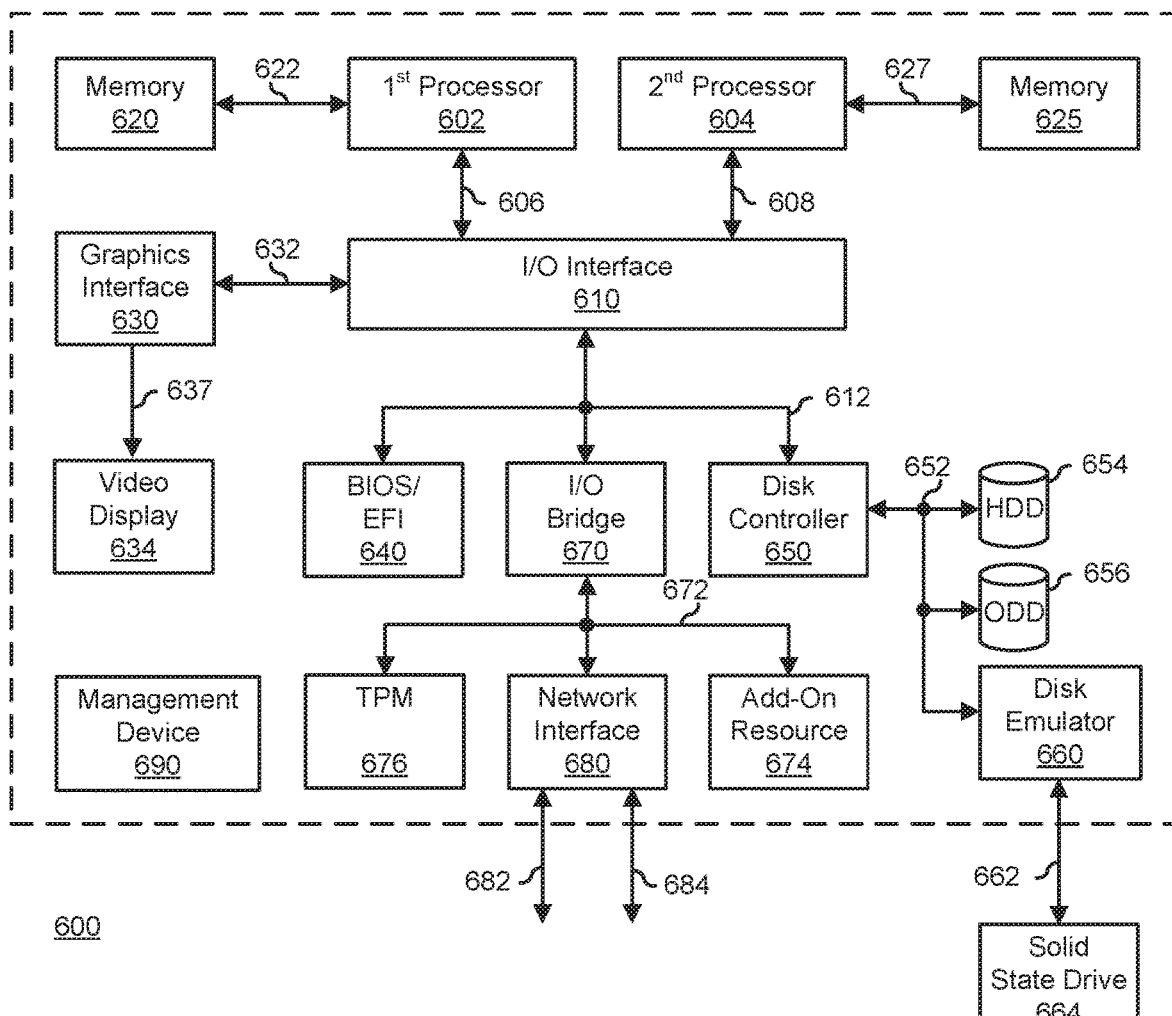
FIG. 6 is a block diagram illustrating a generalized information handling system according to another embodiment of the present disclosure.

FIG. 6 illustrates a generalized embodiment of an information handling system 600 similar to information handling system 100. For purpose of this disclosure an information handling system can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, information handling system 600 can be a personal computer, a laptop computer, a smart phone, a tablet device or other consumer electronic device, a network server, a network storage device, a switch router or other network communication device, or any other suitable device and may vary in size, shape, performance, functionality, and price. Further, information handling system 600 can include processing resources for executing machine-executable code, such as a central processing unit (CPU), a programmable logic array (PLA), an embedded device such as a System-on-a-Chip (SoC), or other control logic hardware. Information handling system 600 can also include one or more computer-readable medium for storing machine-executable code, such as software or data. Additional components of information handling system 600 can include one or more storage devices that can store machine-executable code, one or more communications ports for communicating with external devices, and various input and output (I/O) devices, such as a keyboard, a mouse, and a video display. Information handling system 600 can also include one or more buses operable to transmit information between the various hardware components.

Information handling system 600 can include devices or modules that embody one or more of the devices or modules described below, and operates to perform one or more of the methods described below. Information handling system 600 includes a processors 602 and 604, an input/output (I/O) interface 610, memories 620 and 625, a graphics interface 630, a basic input and output system/universal extensible firmware interface (BIOS/UEFI) module 640, a disk controller 650, a hard disk drive (HDD) 654, an optical disk drive (ODD) 656, a disk emulator 660 connected to an external solid state drive (SSD) 662, an I/O bridge 670, one or more add-on resources 674, a trusted platform module (TPM) 676, a network interface 680, a management device 690, and a power supply 695. Processors 602 and 604, I/O interface 610, memory 620, graphics interface 630, BIOS/UEFI module 640, disk controller 650, HDD 654, ODD 656, disk emulator 660, SSD 662, I/O bridge 670, add-on resources 674, TPM 676, and network interface 680 operate together to provide a host environment of information handling system 600 that operates to provide the data processing functionality of the information handling system. The host environment operates to execute machine-executable code, including platform BIOS/UEFI code, device firmware, operating system code, applications, programs, and the like, to perform the data processing tasks associated with information handling system 600.

In the host environment, processor 602 is connected to I/O interface 610 via processor interface 606, and processor 604 is connected to the I/O interface via processor interface 608. Memory 620 is connected to processor 602 via a memory interface 622. Memory 625 is connected to processor 604 via a memory interface 627. Graphics interface 630 is connected to I/O interface 610 via a graphics interface 632, and provides a video display output 636 to a video display 634. In a particular embodiment, information handling system 600 includes separate memories that are dedicated to each of processors 602 and 604 via separate memory interfaces. An example of memories 620 and 630 include random access memory (RAM) such as static RAM (SRAM), dynamic RAM (DRAM), non-volatile RAM (NV-RAM), or the like, read only memory (ROM), another type of memory, or a combination thereof.

BIOS/UEFI module 640, disk controller 650, and I/O bridge 670 are connected to I/O interface 610 via an I/O channel 612. An example of I/O channel 612 includes a Peripheral Component Interconnect (PCI) interface, a PCI-Extended (PCI-X) interface, a high speed PCI-Express (PCIe) interface, another industry standard or proprietary communication interface, or a combination thereof. I/O interface 610 can also include one or more other I/O interfaces, including an Industry Standard Architecture (ISA) interface, a Small Computer Serial Interface (SCSI) interface, an Inter-Integrated Circuit ($I^2C$) interface, a System Packet Interface (SPI), a Universal Serial Bus (USB), another interface, or a combination thereof. BIOS/UEFI module 640 includes BIOS/UEFI code operable to detect resources within information handling system 600, to provide drivers for the resources, initialize the resources, and access the resources. BIOS/UEFI module 640 includes code that operates to detect resources within information handling system 600, to provide drivers for the resources, to initialize the resources, and to access the resources.

Disk controller 650 includes a disk interface 652 that connects the disk controller to HDD 654, to ODD 656, and to disk emulator 660. An example of disk interface 652 includes an Integrated Drive Electronics (IDE) interface, an Advanced Technology Attachment (ATA) such as a parallel ATA (PATA) interface or a serial ATA (SATA) interface, a SCSI interface, a USB interface, a proprietary interface, or a combination thereof. Disk emulator 660 permits SSD 664 to be connected to information handling system 600 via an external interface 662. An example of external interface 662 includes a USB interface, an IEEE 1394 (Firewire) interface, a proprietary interface, or a combination thereof. Alternatively, solid-state drive 664 can be disposed within information handling system 600.

I/O bridge 670 includes a peripheral interface 672 that connects the I/O bridge to add-on resource 674, to TPM 676, and to network interface 680. Peripheral interface 672 can be the same type of interface as I/O channel 612, or can be a different type of interface. As such, I/O bridge 670 extends the capacity of I/O channel 612 when peripheral interface 672 and the I/O channel are of the same type, and the I/O bridge translates information from a format suitable to the I/O channel to a format suitable to the peripheral channel 672 when they are of a different type. Add-on resource 674 can include a data storage system, an additional graphics interface, a network interface card (NIC), a sound/video processing card, another add-on resource, or a combination thereof. Add-on resource 674 can be on a main circuit board, on separate circuit board or add-in card disposed within information handling system 600, a device that is external to the information handling system, or a combination thereof.

Network interface 680 represents a NIC disposed within information handling system 600, on a main circuit board of the information handling system, integrated onto another component such as I/O interface 610, in another suitable location, or a combination thereof. Network interface device 680 includes network channels 682 and 684 that provide interfaces to devices that are external to information handling system 600. In a particular embodiment, network channels 682 and 684 are of a different type than peripheral channel 672 and network interface 680 translates information from a format suitable to the peripheral channel to a format suitable to external devices. An example of network channels 682 and 684 includes InfiniBand channels, Fibre Channel channels, Gigabit Ethernet channels, proprietary channel architectures, or a combination thereof. Network channels 682 and 684 can be connected to external network resources (not illustrated). The network resource can include another information handling system, a data storage system, another network, a grid management system, another suitable resource, or a combination thereof.

Management device 690 represents one or more processing devices, such as a dedicated baseboard management controller (BMC) System-on-a-Chip (SoC) device, one or more associated memory devices, one or more network interface devices, a complex programmable logic device (CPLD), and the like, that operate together to provide the management environment for information handling system 600. In particular, management device 690 is connected to various components of the host environment via various internal communication interfaces, such as a Low Pin Count (LPC) interface, an Inter-Integrated-Circuit (I2C) interface, a PCIe interface, or the like, to provide an out-of-band (00B) mechanism to retrieve information related to the operation of the host environment, to provide BIOS/UEFI or system firmware updates, to manage non-processing components of information handling system 600, such as system cooling fans and power supplies. Management device 690 can include a network connection to an external management system, and the management device can communicate with the management system to report status information for information handling system 600, to receive BIOS/UEFI or system firmware updates, or to perform other task for managing and controlling the operation of information handling system 600. Management device 690 can operate off of a separate power plane from the components of the host environment so that the management device receives power to manage information handling system 600 when the information handling system is otherwise shut down. An example of management device 690 include a commercially available BMC product or other device that operates in accordance with an Intelligent Platform Management Initiative (IPMI) specification, a Web Services Management (WSMan) interface, a Redfish Application Programming Interface (API), another Distributed Management Task Force (DMTF), or other management standard, and can include an Integrated Dell Remote Access Controller (iDRAC), an Embedded Controller (EC), or the like. Management device 690 may further include associated memory devices, logic devices, security devices, or the like, as needed or desired.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

The above-disclosed subject matter is to be considered illustrative, and not restrictive, and the appended claims are intended to cover any and all such modifications, enhancements, and other embodiments that fall within the scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. An information handling system for distributing software, the system comprising:
   a distribution management system configured to provide a software packet, the software packet including the software and a smart contract, an execution of the smart contract being validated and recorded by a blockchain system; and
   a plurality of target systems to receive the software, the target systems organized into a plurality of groups, each group including a first target system in a first tier and at least one second target system in a second tier;
   wherein the distribution management system provides the software packet to each first target system, wherein each first target system executes the smart contract, provides a first indication to the distribution management system as to whether or not the software was successfully installed on the first target system, and if the software was successfully installed on the first target system, provides the software packet to its associated second target system, and wherein each second target system that receives the software packet executes the smart contract, and provides a second indication to the distribution management system as to whether the software was successfully installed on the second target system and wherein the distribution management system further determines that a first indication indicates that the software packet was not successfully installed on a particular first target system, and places a particular second target system associated with the particular first target system on a blacklist, the blacklist preventing the particular second target system from receiving the software packet; and wherein the distribution management system further determines a number of second indications that indicate that the software packet was not successfully installed on the second target systems is greater than a threshold, and suspends further distribution of the software packet when the number is greater than the threshold.

2. The information handling system of claim 1, wherein, for each group of first and second target systems, the distribution management system is further configured to select the first target system and the associated second target system in each group based upon the first target system and the associated second target system in each group having a common configuration.

3. The information handling system of claim 2, wherein the distribution management system is further configured to include a list of grouped first and second target systems within the smart contract.

4. The information handling system of claim 2, wherein the distribution management system is further configured to provide a rule within the smart contract, wherein in executing the rule, each one of the information handling systems determines that it is in one of the first tier and the second tier.

5. The information handling system of claim 1, wherein:
the plurality of target systems further includes third tier of third target systems, wherein at least one of the second target systems is grouped with at least one of the third target systems; and
at least one second target system executes the smart contract, and provides the software packet to at least one of the third target systems based upon the execution of the smart contract.

6. The information handling system of claim 1, wherein, for each group of first and second target systems, the distribution management system is further configured to select the first target system and the associated second target system in each group based upon the first target system and the associated second target system in each group being on a common subnetwork.

7. The information handling system of claim 1, wherein, for each group of first and second target systems, the distribution management system is further configured to select the first target system and the associated second target system in each group based upon the first target system and the associated second target system in each group having a common user base.

8. The information handling system of claim 1, wherein, for each group of first and second target systems, the distribution management system is further configured to select the first target system and the associated second target system in each group based upon the first target system and the associated second target system in each group having a common component.

9. The information handling system of claim 1, wherein, for each group of first and second target systems, the distribution management system is further configured to select the first target system and the associated second target system in each group based upon the associated second target system in each group having a common configuration, and wherein the associated first target system does not have the common configuration.

10. A method for distributing software, the method comprising:
providing, by a distribution management system of an information handling system configured to distribute software to a plurality of target systems, a software packet including the software and a smart contract, an execution of the smart contract being validated and recorded by a blockchain system, wherein the target systems are organized into a plurality of groups, each group including a first target system in a first tier and at least one second target system in a second tier;
receiving, by each first target system, the software packet;
executing, by each first target system, the smart contract;
validating, by the blockchain system, the execution of the smart contract by each first target system;
providing a first indication to the distribution management system as to whether the software was successfully installed on the first target system;
determining that a first indication indicates that the software packet was not successfully installed on a particular first target system;
placing a particular second target system associated with the particular first target system on a blacklist, the blacklist preventing the particular second target system from receiving the software packet;
providing, by each first target system that successfully executed the software packet, the software packet to the associated second target systems;
providing, by each second target system that received the software packet from its associated first target system, a second indication to the distribution management system as to whether the software was successfully installed on the second target system;
determining a number of second indications that indicate that the software packet was not successfully installed on the second target systems is greater than a threshold; and
suspending the further distribution of the software packet when the number is greater than the threshold.

11. The method of claim 10, further comprising:
selecting, by the distribution management, the first target systems and the second target systems.

12. The method of claim 11, wherein, for each group of first and second target systems, the method further comprises:
selecting, by the distribution management system, the first target system and the associated second target system in each group based upon the first target system and the associated second target system in each group having a common configuration.

13. The method of claim 12, further comprising:
including, by the distribution management system, a list of grouped first and second target systems within the smart contract.

14. The method of claim 12, further comprising:
providing, by the distribution management system, a rule within the smart contract, wherein in executing the rule, each one of the information handling systems determines that it is in one of the first tier and the second tier.

15. The method of claim 10, wherein:
executing, by at least one second target system, the smart contract; and providing the software packet to at least one third target system in a third tier of the plurality of target systems based upon the execution of the smart contract.

16. The method of claim 10, wherein, for each group of first and second target systems, the distribution management system is further configured to select the first target system and the associated second target system in each group based upon the first target system and the associated second target system in each group being on a common sub-network.

17. The method of claim 10, wherein, for each group of first and second target systems, the distribution management system is further configured to select the first target system and the associated second target system in each group based upon the first target system and the associated second target system in each group having a common user base.

18. The method of claim 10, wherein, for each group of first and second target systems, the distribution management system is further configured to select the first target system and the associated second target system in each group based upon the first target system and the associated second target system in each group having a common component.

19. The method of claim 10, wherein, for each group of first and second target systems, the distribution management system is further configured to select the first target system and the associated second target system in each group based upon the associated second target system in each group having a common configuration, and wherein the associated first target system does not have the common configuration.

20. An information handling system for distributing software, the system comprising:
- a blockchain system;
- a distribution management system configured to provide a software packet, the software packet including the software and a smart contract, an execution of the smart contract being validated and recorded by the blockchain system; and
- a plurality of target systems to receive the software, the target systems organized into a plurality of groups, each group including a first target system in a first tier and at least one second target system in a second tier;
- wherein the distribution management system provides the software packet to each first target system, wherein each first target system executes the smart contract, provides a first indication to the distribution management system as to whether the software was successfully installed on the first target system, and if the software was successfully installed on the first target system, provides the software packet to its associated second target system, wherein each second target system that receives the software packet executes the smart contract, and provides a second indication to the distribution management system as to whether the software was successfully installed on the second target system, and wherein the smart contract includes a list of grouped first and second target systems;
- wherein the distribution management system further determines that a first indication indicates that the software packet was not successfully installed on a particular first target system, and places a particular second target system associated with the particular first target system on a blacklist, the blacklist preventing the particular second target system from receiving the software packet; and
- wherein the distribution management system further determines a number of second indications that indicate that the software packet was not successfully installed on the second target systems is greater than a threshold, and suspends further distribution of the software packet when the number is greater than the threshold.

* * * * *